United States Patent [19]
Townsend

[11] 3,931,665
[45] Jan. 13, 1976

[54] STRIPPER MEANS FOR MEAT SKINNING MACHINES

[75] Inventor: Ray T. Townsend, Des Moines, Iowa

[73] Assignee: Townsend Engineering Company, Des Moines, Iowa

[22] Filed: Aug. 23, 1974

[21] Appl. No.: 500,130

[52] U.S. Cl. .................................................. 17/21
[51] Int. Cl.² ........................................... A22B 5/16
[58] Field of Search ............................ 17/21; 99/589

[56] References Cited
UNITED STATES PATENTS
3,100,515   8/1963   Schill .................................... 99/589

*Primary Examiner*—Robert Peshock
*Attorney, Agent, or Firm*—Zarley, McKee, Thomte & Voorhees

[57] ABSTRACT

A stripper means for meat skinning machines is disclosed wherein the machine includes a driven toothed roll which is rotatably mounted on a frame means adjacent one end of a feed table. A pressure shoe means extends around a portion of the driven roll and has a skinning blade extending therefrom for severing the skin from the meat product as the product is moved thereby. The driven roll is provided with a plurality of spaced apart annular grooves formed in the peripheral surface thereof. A stripping shaft is mounted on the frame means below the driven roll and has a plurality of stainless steel stripping elements or blades mounted thereon in a spaced apart relationship. The stripping shaft is provided with a plurality of spaced apart grooves formed in one side thereof which receive one end of the stripping element. Each of the stripper elements has a hook-like upper end portion which is received in the grooves of the driven roll with the hook portion extending around the driven roll in excess of 180° thereof. The stripping shaft is selectively rotatably mounted on the frame means and is selectively slidably mounted thereon to permit the stripping elements to be adjusted relative to the driven roll. The construction of the stripping elements is such that the stripping elements slightly oscillate laterally on the stripping shaft during the stripping operation so that the stripping elements are self-cleaning.

12 Claims, 7 Drawing Figures

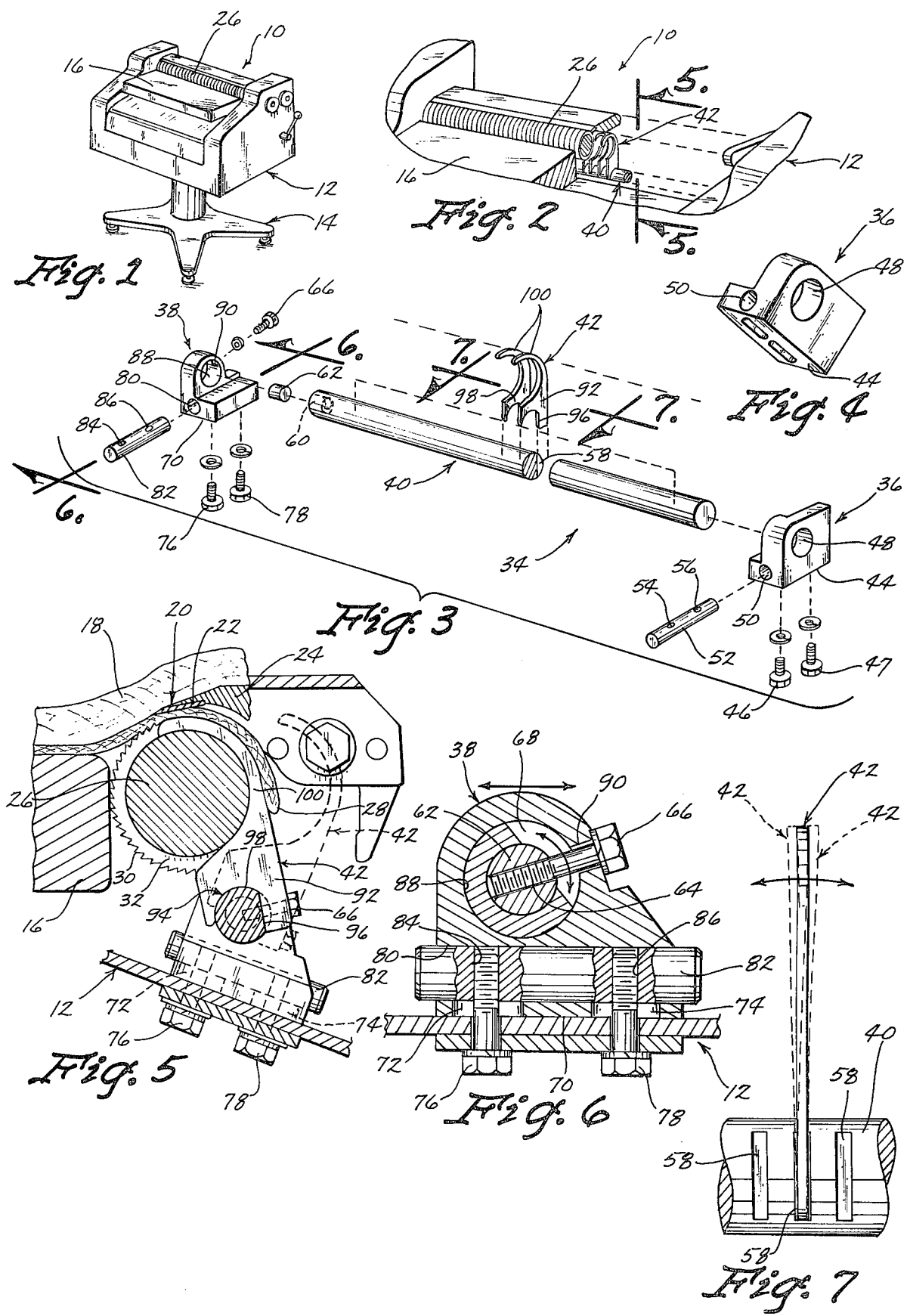

3,931,665

STRIPPER MEANS FOR MEAT SKINNING MACHINES

BACKGROUND OF THE INVENTION

Skinning machines such as those described in U.S. Pat. No. Re. 23,222; U.S. Pat. No. 2,522,728; and U.S. Pat. No. 2,912,027 are employed to remove the skins from meat products. Generally speaking, the skinning machines are provided with a driven toothed roll rotatably mounted on a frame means adjacent one end of a feed tray or the like. A pressure shoe means having a skinning blade mounted thereon is movably mounted on the frame means and is adapted to sever the skin from the meat product with the severed skin passing between the toothed roll and the pressure shoe means.

U.S. Pat. No. 3,741,105 disclosed a plastic stripping blade or element for use on the machines described above. The plastic stripping element disclosed in U.S. Pat. No. 3,741,105 overcame many of the disadvantages of the prior art and the instant invention represents an improvement over the stripping blades of said patent in that a stripping element is provided which oscillates laterally to permit the stripping elements to be self-cleaning. Further, the instant invention provides a better stripping action than the stripping blades of U.S. Pat. No. 3,741,105 and the adjustment means of this invention also is vastly improved over that disclosed in said patent.

Therefore, it is a principal object of the invention to provide a stripping means for a skinning machine.

A further object of the invention is to provide a stripper means for a meat skinning machines comprising a plurality of spaced apart stripper elements which are adjustably movable towards and away from the toothed stripper roll.

A further object of the invention is to provide a stripper means for meat skinning machines comprising a plurality of spaced apart stripper elements including a hook portion which extends more than one-half the circumference of the driven toothed roll.

A further object of the invention is to provide a stripper means for meat skinning machines comprising a plurality of spaced apart stripper elements which oscillate laterally so that they are self-cleaning.

A further object of the invention is to provide a stripper means for meat skinning machines which may be easily cleaned.

A further object of the invention is to provide a stripper means for meat skinning machines comprising a plurality of stripper elements with each of the stripper elements including a hook portion positioned in a groove in the toothed roller wherein the height of the hook portion is slightly higher than the base of the teeth so that just a small portion of the teeth is exposed.

A still further object of the invention is to provide a stripping means for meat skinning machines which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the meat skinning machine:

FIG. 2 is a partial exploded perspective view of the meat skinning machine:

FIG. 3 is an exploded perspective view of the stripper means of this invention:

FIG. 4 is a perspective view of one of the end plates for mounting the stripper means:

FIG. 5 is an enlarged sectional view seen on lines 5—5 of FIG. 2:

FIG. 6 is an enlarged sectional view seen on lines 6—6 of FIG. 3; and

FIG. 7 is an end view of one of the stripper elements illustrating the manner in which the element laterally oscillates.

DESCRIPTION OF THE PREFERRED EMBODIMENT

With respect to the drawings, the numeral 10 generally designates a skinning machine substantially conventional in design and is of the type manufactured by Townsend Engineering Company of Des Moines, Iowa. The machine 10 generally comprises a frame means 12 mounted on a pedestal 14. A feed table 16 is mounted on the frame means 12 for moving the product 18 towards the skinning blade means 20.

Skinning blade means 20 includes a blade 22 which extends from the leading edge of a pressure shoe 24 which is movably mounted on the frame means 12 in conventional fashion so that the shoe may "float" with respect to the driven or toothed roll 26 which is rotatably mounted on the frame means 12. The purpose of the toothed roll 26 is to aid in removing the skin 28 from the meat product 18 after it has been severed therefrom by the skinning blade 22. The toothed roll 26 also aids in pulling the meat product towards the skinning blade 22. The toothed roll 26 pulls the severed portion of the skin 28 downwardly from the blade 22 in conventional fashion between the roll 26 and the pressure shoe 24. Roll 26 is provided with a serrated peripheral surface or teeth 30 which project therefrom for gripping the skin. Roll 26 is also provided with a plurality of spaced apart annular grooves 32 formed therein which extend inwardly from the peripheral surface thereof.

The numeral 34 refers generally to the stripper means of this invention comprising generally end plates 36 and 38, stripper shaft 40 and stripper elements 42. End plate 36 includes a bottom 44 having a pair of spaced apart elongated openings or slots extending upwardly thereinto adapted to receive screws 46 and 47. End plate 36 is also provided with a bore 48 formed therein which is adapted to receive one end of the shaft 40. The numeral 40 refers to a bore extending between the forward and rearward ends of the end plate 36 which is adapted to receive the slide pin 52 which has a pair of threaded openings 54 and 56 formed therein which are adapted to receive screws 46 and 47 respectively.

Shaft 40 is provided with a plurality of spaced apart grooves 58 formed in one side thereof as will be described in more detail hereinafter. One end of shaft 40 is provided with a bore 60 which is adapted to receive plug 62 therein. Plug 62 is provided with a threaded opening 64 adapted to receive screw 66. Shaft 40 is also provided with an elongated groove 68 formed therein extending inwardly therein from one side thereof which communicates with the bore 60.

End plate 38 comprises a bottom portion 70 having a pair of spaced apart elongated openings or slots 72 and 74 formed therein which are adapted to receive the screws 76 and 78 extending therethrough respectively. The slots 72 and 74 are identical to the slots extending upwardly through bottom 44 of end plate 36. End plate 38 is provided with an elongated bore 80 adapted to receive the slide pin 82. Slide pin 82 has a pair of threaded openings 84 and 86 which are adapted to threadably receive the screws 76 and 78 respectively. End plate 38 has an opening 88 formed therein which is adapted to receive one end of the shaft 40 as illustrated in the drawings. End plate 38 also has an opening 90 formed therein which extends inwardly from one side thereof into the opening 88 for receiving the screw 66.

Each of the stripper elements 42 comprises a base portion 92 having an opening 94 extending upwardly thereinto. As seen in FIG. 5, each of the openings 94 is defined by a straight portion 96 and an arcuate portion 98. The elements 42 are mounted on the shaft 40 by snapping the same into place so that the straight portion 96 of opening 94 is received by the groove 58 formed in the shaft 40 and so that the arcuate portion 98 embraces the upper periphery of the shaft 40. Each of the stripper elements 42 also comprises a hook portion 100 which is received by one of the annular grooves 32 as illustrated in FIG. 5. Hook portion 100 embraces more than one-half the circumference of the roll 26 or more than 180° of the roll as illustrated in the drawings. As seen in FIG. 5, hook portion 100 has a height such that the upper edge thereof is positioned slightly above the base portion of each of the teeth 30. It can be seen that the height of portion 100 is such that only a portion of the teeth are exposed thereabove.

The end plates 36 and 38 are mounted on the frame means 12 as illustrated in the drawings so that the bolts 46, 47, 76 and 78 extend upwardly through the frame means and are received by the slots formed in the bottom portions of the end plates. The end plates have the opposite ends of the shaft 40 received therein and it can be seen that the slots formed in the bottom portions of the end plates permit the end plates to be slidably moved towards or away from the roller 26 since the slide pins 52 and 82 provide the slidable connection. When the end plates 36 and 38 are in the desired position, the screws 46, 47, 76 and 78 are tightened which causes the slide pins 52 and 82 to draw the end plates downwardly into frictional engagement with the frame means 12 to limit any further movement thereof.

The shaft 40 is rotatably mounted in the openings 48 and 88 of the end plates 36 and 38 respectively and is maintained in its various positions of rotation by the screw 66. When the shaft 40 has been rotated to its proper position such as seen in FIG. 5, screw 66 is threadably rotated to cause plug 62 to be urged towards the right as viewed in FIG. 6 so that the shaft 40 is prevented from rotational movement relative to the plug 62.

When it is desired to clean the stripper elements 42 or to rotate the same to a different position, it is simply necessary to loosen the screw 66 which permits the shaft 40 to be rotated relative to the plug 62 and the end plates.

As seen in FIG. 5, the hook portions 100 have a thickness sufficient so that the upper ends thereof are positioned above the base portion of the teeth 30 and so that the upper ends thereof are positioned slightly below the exposed portions of the teeth to aid in stripping the skin from the roll 26 and to aid in cutting sinew, etc. The stainless steel stripper elements 42 and the means for mounting the same permits the teeth to laterally oscillate as seen in FIG. 7 so that the stripper elements are substantially self-cleaning.

Thus it can be seen that a novel stripping means has been provided for a skinning machine which permits the stripper elements to be precisely adjusted relative to the toothed roll and which permits the stripper elements to be easily installed or removed. Thus it can be seen that the invention accomplishes at least all of its stated objectives.

I claim:

1. In a device of the class described, a frame means, a driven roll rotatably mounted on said frame means, said driven roll having a plurality of spaced apart annular grooves formed therein which extend inwardly into the peripheral surface thereof, a skinning blade means on said frame means and positioned adjacent said driven roll for severing the skin from the product being skinned, the severed skin being gripped by said driven roll and being passed between the periphery of said driven roll and said skinning blade means, a stripper shaft on said frame means below said driven roll, a plurality of stripper elements detachably secured to said stripper shaft in a spaced apart relationship, each of said stripper elements having an arcuate hook portion which is received in one of said grooves in said roll so as to extend around a portion of said driven roll whereby said stripper elements will strip the severed skin from said driven roll, said stripper elements each having a base portion with an opening in one of the margins thereof, said opening having inner margins which slidably embrace said shaft, said shaft and said inner margins of said opening in said base portions each having complementary surfaces which engage one another to hold said stripper elements against rotation with respect to said shaft while at the same time permitting sliding movement of said stripper element radially outwardly from said shaft.

2. The device of claim 1 wherein said stripper shaft is selectively pivotally mounted, about its longitudinal axis, on said frame means to permit said stripper elements to be pivotally moved towards said driven roll and away from said driven roll.

3. The device of claim 1 wherein said stripper shaft is selectively adjustably mounted on said frame means to permit said stripper elements to be moved towards said driven roll and away from said driven roll.

4. The device of claim 2 wherein said stripper shaft is also selectively adjustably mounted on said frame means to permit said stripper elements to be moved towards said driven roll and away from said driven roll.

5. The device of claim 1 wherein said stripper shaft has a plurality of spaced apart grooves formed therein at one side thereof, each of said stripper elements having a lower end portion having an opening extending upwardly therein, each of said openings being defined by a straight wall portion adapted to be received by one of said grooves and a semi-circular wall portion adapted to embrace a portion of the periphery of said stripper shaft.

6. The device of claim 1 wherein said driven roll has a plurality of teeth extending from the periphery thereof between said annular grooves, said hook portions of each of said stripper having an upper end which is positioned inwardly of the outer ends of said teeth.

7. The device of claim 6 wherein each of said teeth have inner and outer ends and wherein said upper ends of said stripper elements are positioned outwardly of the inner ends of said teeth.

8. The device of claim 1 wherein each of said hook portions of said stripper elements have an end portion which is positioned below and closely adjacent said skinning blade means.

9. The device of claim 1 wherein said stripper elements are comprised of a stainless steel material so that said hook portions oscillate laterally with respect to said annular grooves in said driven roll.

10. The device of claim 1 wherein said driven roll has rearward and forward portions, said hook portion of each of said stripper elements extending around the forward portion of said driven roll more than one-half the circumference thereof.

11. The device of claim 1 wherein first and second end plates are adjustably slidably mounted on said frame means, said stripper shaft being adjustably rotatably mounted on and extending between said end plates.

12. The device of claim 11 wherein one end of said stripper shaft has a first bore formed therein and extending inwardly thereinto, a plug rotatably mounted in said first bore and having a threaded opening formed therein, said stripper shaft having a slot formed therein at one side thereof extending inwardly thereinto which communicates with said first bore, each of said end plates having shaft openings formed therein which rotatably receive the opposite ends of said stripper shaft, one of said end plates having a bolt opening formed therein which communicates with the said shaft opening and a bolt means extending through said bolt opening and being threadably received by the threaded opening in said plug to permit said stripper shaft to be selectively positioned in various positions of rotational movement relative to said end plates and said driven roll.

* * * * *